(12) United States Patent
Russo et al.

(10) Patent No.: US 8,527,589 B2
(45) Date of Patent: Sep. 3, 2013

(54) COMMUNITY ENROLLMENT MODELING

(75) Inventors: Joseph A. Russo, Westford, MA (US); Robert Yates, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 2161 days.

(21) Appl. No.: 10/737,131

(22) Filed: Dec. 15, 2003

(65) Prior Publication Data

US 2005/0132033 A1 Jun. 16, 2005

(51) Int. Cl.
*G06F 15/16* (2006.01)
*G06Q 30/00* (2012.01)
*G06F 17/00* (2006.01)

(52) U.S. Cl.
USPC ............. 709/205; 705/14.3; 709/203; 463/42

(58) Field of Classification Search
None
See application file for complete search history.

(56) References Cited

U.S. PATENT DOCUMENTS

| | | | |
|---|---|---|---|
| 6,480,885 B1 * | 11/2002 | Olivier | 709/207 |
| 6,865,268 B1 * | 3/2005 | Matthews et al. | 379/265.09 |
| 7,143,089 B2 * | 11/2006 | Petras et al. | 707/5 |
| 2003/0078789 A1 * | 4/2003 | Oren | 705/1 |
| 2004/0088222 A1 * | 5/2004 | Suzuki et al. | 705/14 |

\* cited by examiner

*Primary Examiner* — Wen-Tai Lin
(74) *Attorney, Agent, or Firm* — Steven M. Greenberg, Esq.; Carey, Rodriguez, Greenberg & O'Keefe

(57) ABSTRACT

A method and system for managing enrollment in a collaborative computing environment community are provided. One or more of a group of users wishing to enroll in the collaborative computing community are identified and an enrollment model is implemented. It is then determined if any of the group of users are selected to be enrolled based upon the selected enrollment model. The current community membership is then updated as a result of determining whether to enroll any of the group of users based upon the selected enrollment model.

27 Claims, 4 Drawing Sheets

\* Sponsor May become member for Trial Period, then Community must Vote after Trial Period in "Trial Period" Model

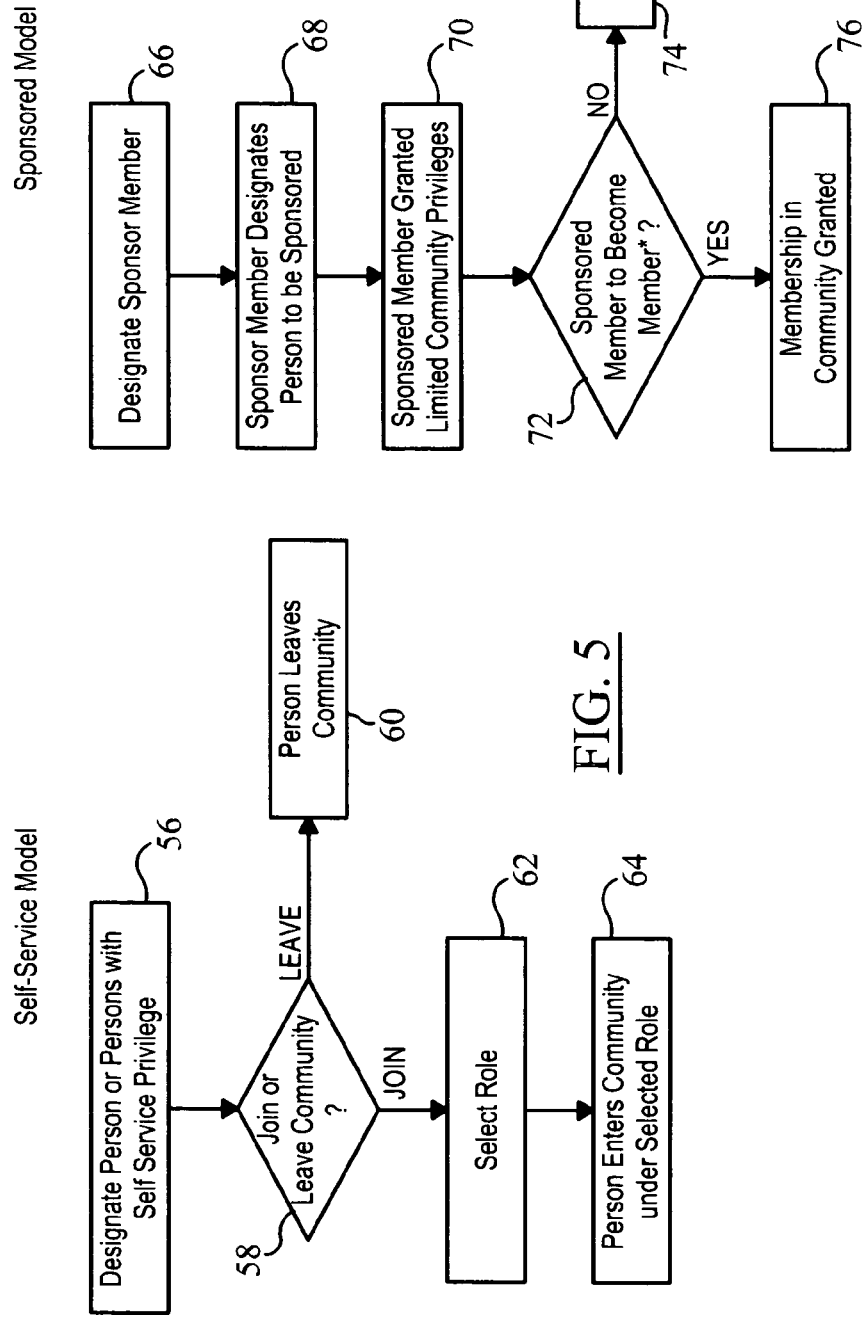

COMMUNITY ENROLLMENT MODELING

BACKGROUND OF THE INVENTION

1. Statement of the Technical Field

The present invention relates to collaborative computing environments and, in particular, to the implementation of modeling guidelines that support the enrollment of new community members in the collaborative computing community.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include document libraries, instant messaging, chat rooms, and application sharing.

Conventional collaborative computing includes combinations of collaborative technologies in order to provide a means for members of a collaborative community to pool their strengths and experiences to achieve a common goal. For instance, a common goal can include an educational objective, the completion of a software development project or even the creation and use of a system to manage human resources. A collaborative computing community generally can be defined by (1) a particular context, i.e. the objective of the environment, (2) membership, i.e., the participants in the environment, (3) a set of roles for the members, and (4) resources and tools which can be accessed by the membership in furtherance of the objective of the environment. Roles are names given to the people in the environment which dictate access to the resources and tools within the environment as well as define the behavior of the community members.

Community membership is not static and members may request to join or leave at various times. Like any community environment, enrollment in the community should be governed by set standards and policies to insure the computing objective of the community is achieved. Therefore, it would be desirable to have a method and system that provides models of standard enrollment guidelines, allowing existing members of the community to enroll new community members while maintaining the infrastructure of the community and without deviating from the community's objectives and goals.

SUMMARY OF THE INVENTION

The present invention addresses the deficiencies in the art with respect to managing enrollment within a collaborative community and provides a novel and non-obvious method and system for implementing one of a variety of enrollment models in order to control and streamline community access membership.

Methods consistent with the present invention provide a method for managing member enrollment in a collaborative computing community. The method includes identifying one or more end user persons for enrollment in the collaborative computing community and implementing an enrollment model to determine whether to enroll the one or more identified end user persons as members in the community. Finally, the community membership is updated to enroll the one or more end user persons based on the implemented enrollment model.

Systems consistent with the present invention include a system for managing member enrollment in a networked collaborative computing community. The system includes a workstation, and a collaborative computing server in data communication with the workstation via the network. In operation, the collaborative computing server identifies one or more end user persons for enrollment in the collaborative computing community and implements an enrollment model to determine whether to enroll the one or more identified end user persons as members in the community. The system then updates community membership to enroll the one or more end user persons based on the implemented enrollment model.

In accordance with another aspect, the present invention provides a computer readable storage medium storing a computer program which when executed performs a method for managing member enrollment in a collaborative computing community. The method includes identifying one or more end user persons for enrollment in the collaborative computing community, implementing an enrollment model to determine whether to enroll the one or more identified end user persons as members in the community, and updating community membership to enroll the one or more end user persons based on the implemented enrollment model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 5 is a flowchart illustrating the self-service model for supporting the enrollment of new community members in a collaborative computing environment; and FIG. 6 is a flowchart illustrating the sponsored and trial period models for supporting the enrollment of new community members in a collaborative computing environment.

DETAILED DESCRIPTION OF THE PREFERRED EMBODIMENTS

Figure 1:
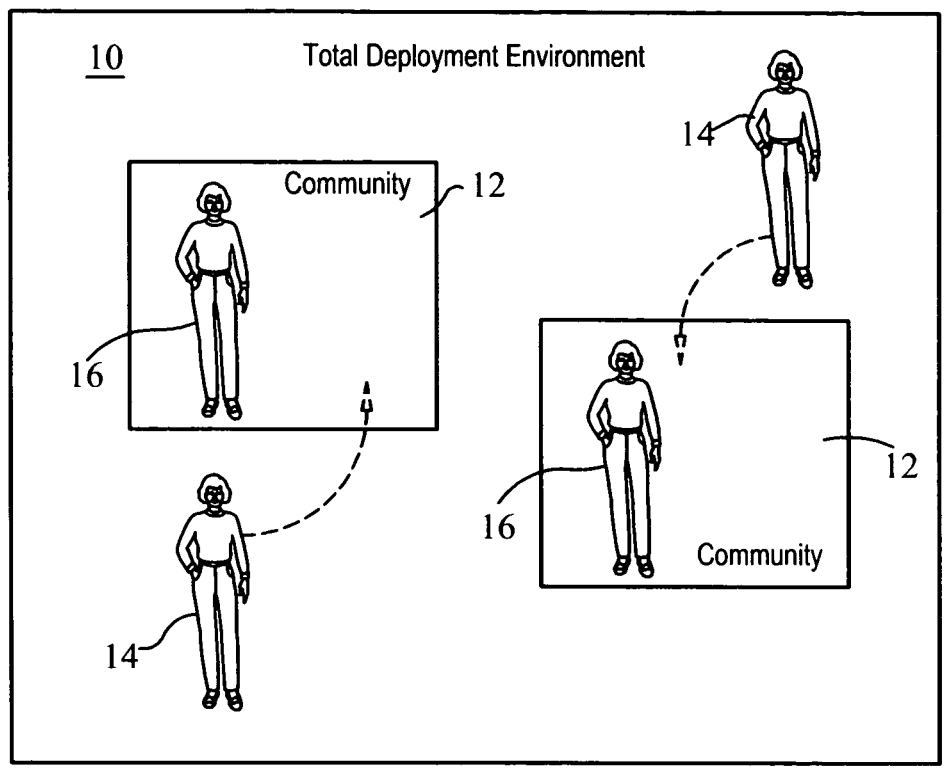
FIG. 1 is a block diagram of a hierarchy of a typical collaborative computing deployment environment constructed in accordance with the principles of the present invention.

The present invention is a method and system for providing modeling guidelines for the enrollment of new members in a collaborative community environment. Referring now to the drawing figures in which like reference designators refer to like elements, there is shown in FIG. 1 a block diagram of a hierarchy of a typical collaborative computing deployment environment constructed in accordance with the principles of the present invention and designated generally as 10. Each community 12 represents a collaborative computing community provided within total collaborative computing deployment environment 10. Communities 12 can be populated by end user persons 14 who become members 16 thereof. One or more end user persons 14 can be arranged into groups 16. In accordance with the principles of the present invention, grouped end user persons 14 can be enrolled in the community under the guidelines of a variety of enrollment models. The enrollment process is described in detail below.

Figure 2:
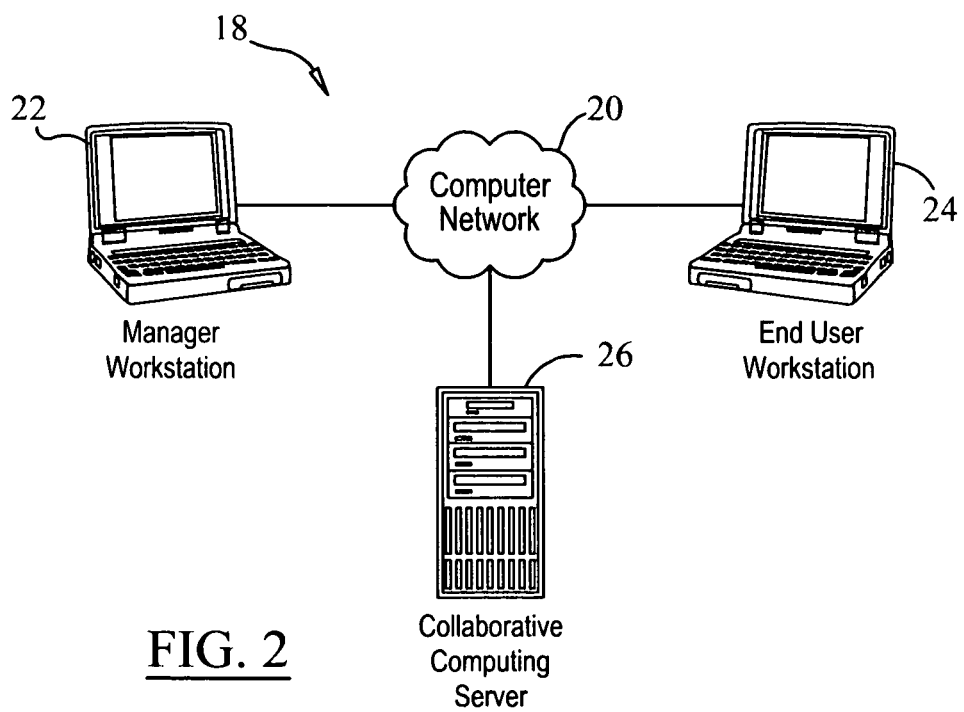
FIG. 2 is an iconic diagram of a collaborative computing system constructed in accordance with the principles of the present invention.

A collaborative computing system constructed in accordance with the principles of the present invention is explained with reference to FIG. 2. System 18 includes computer network 20 to which is coupled manager workstation 22, end user workstation 24 and collaborative computing server 26. Computer network 20 can be any network known in the art for facilitating the transmission of information from one computing device to another using any known communication protocol.

Manager workstation 22, end user workstation 24 and collaborative computing server 26 can be any computing devices capable of performing the functions described herein. For example, a typical combination of hardware and software could be a general purpose computer having a central processing unit and a computer program stored on a storage medium that, when loaded and executed, controls the computer system such that it carries out the methods and functions described herein. The present invention can also be embedded in one or more computer program products which comprise all the features enabling the implementation of the methods described herein, and which, when loaded in a computer system is able to carry out these methods. The storage medium can be any volatile or non-volatile storage device.

Manager workstation 22 and end user workstation 24 can, for example, be any microprocessor-based computing device such as a desktop or laptop computer, personal digital assistant (PDA), hand held computer, etc. running any suitable operating system and providing the user with a display and input device such as a keyboard, touch screen, mouse, and the like. It is presumed that one of ordinary skill in the art could appropriately size the components of workstations 22 and 24 and collaborative computing server 26 to accommodate the expected demands placed on these devices during operation of system 18. No physical distinction is intended herein between workstations 22 and 24. Rather to ease understanding of the present invention, manager workstation 22 refers to the computing device used by the person who is initiating and managing the enrollment into the community and end user workstation 24 refers to the computing device used by a person being enrolled in the collaborative computing community.

Collaborative computing server 26 is arranged to store the databases described herein and executes the software which provides deployment environment 10 and communities 12. In operation, a manager, administrator or other user operates manager workstation 22 which communicates with collaborative computing server 26 to enroll members and manage the enrollment process. As such, an end user person 14 that is a candidate for enrollment uses end user workstation 24 to communicate with collaborative computing server 26 during the enrollment process.

Figure 3:
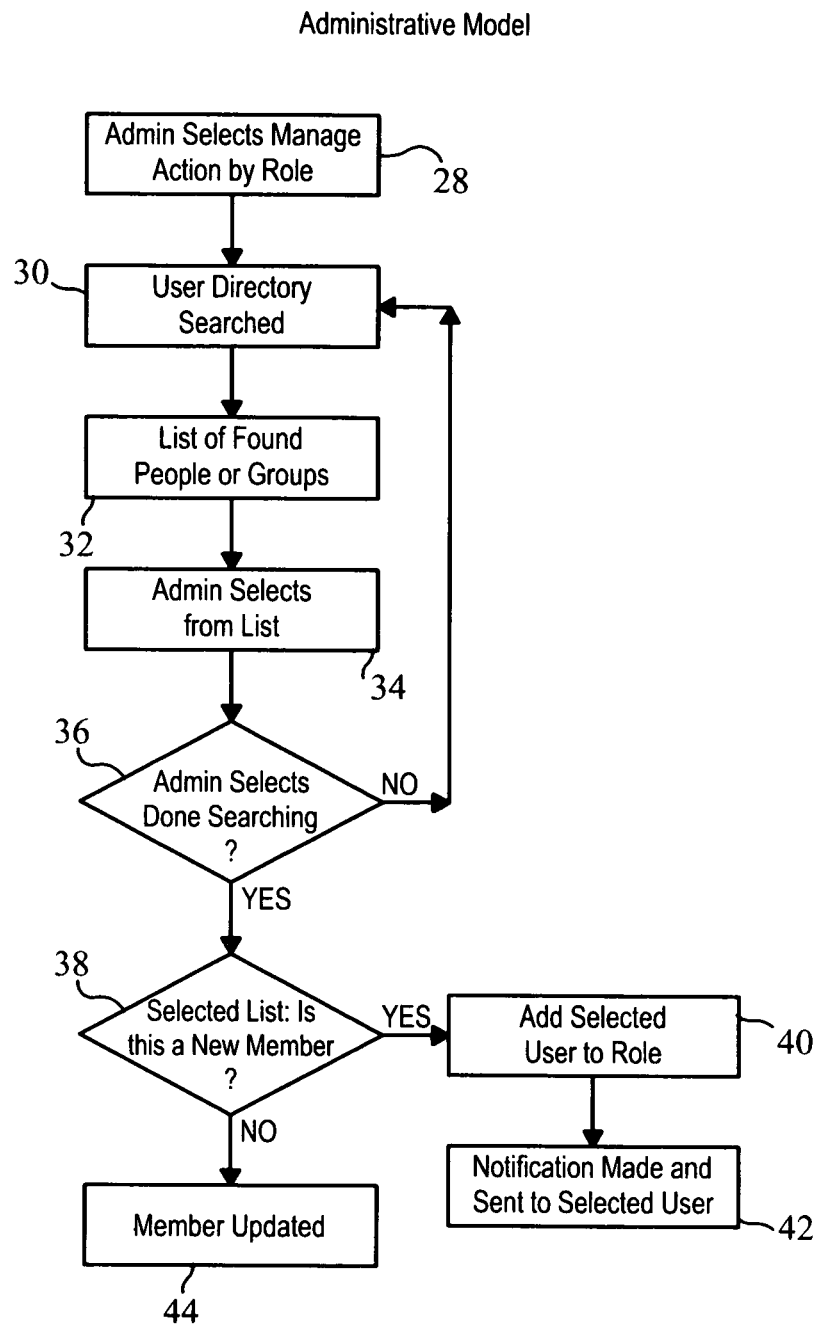
FIG. 3 is a flowchart illustrating the administrative model for supporting the enrollment of new community members in a collaborative computing environment.

The present invention proposes several enrollment behavior models for a given collaborative community. One model is an Administrative Model where some end user person or persons 14 are granted the privilege to manage community enrollment. The administrative model is shown in FIG. 3. An end user person (or persons) 14 within the community is designated with the privilege of managing the community enrollment by adding or removing community members (step 28). The designee ("administrator") may be presented with an interface where a list of actions are shown, along with the current membership of the community, preferably, segregated along community roles. The administrator then searches a user directory for candidates to be enrolled in the community (step 30).

Once a candidate or list of candidates are found (step 32), the administrator can view the list and select from the list (step 34) in order to choose one or more end user persons 14 as a new community member (step 36). If the administrator selects an end user person 14 who is a new member (step 38), the selected person is added as a new member 16 having a particular role (step 40) and that person is notified that they are now a new member 16 of the community (step 42). The role selected could be a role that the community would like to see filled. If the selected end user person 14 is already a member, the member's role information is updated (step 44). The administrator is also granted the privilege to remove members 16 of the community. In this scenario, the administrator is presented with a current listing of all community members 16 and may select which members 16 are to be removed.

Figure 4:
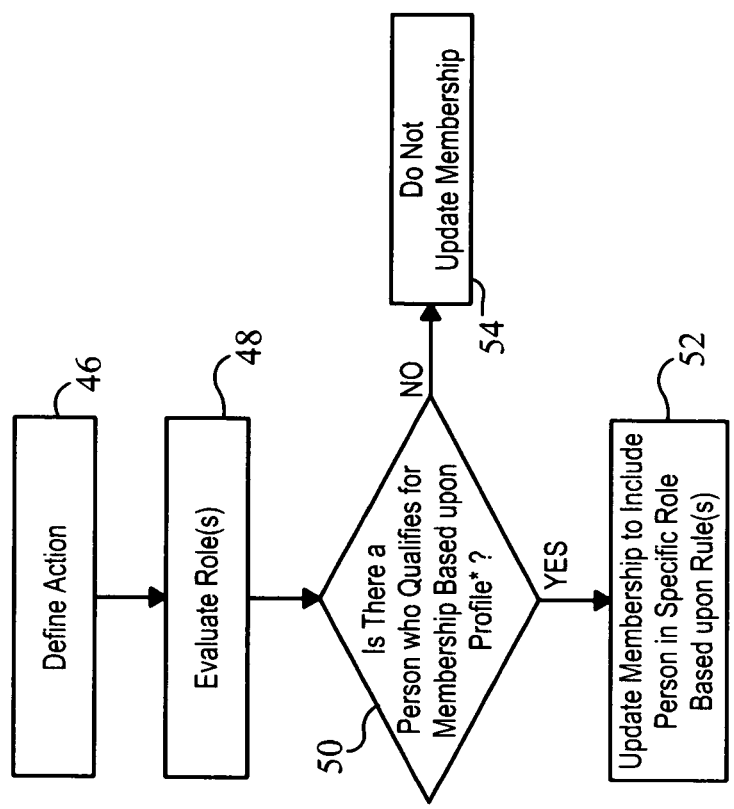
FIG. 4 is a flowchart illustrating the profile and fee-based models for supporting the enrollment of new community members in a collaborative computing environment.

An alternate model that may be implemented to govern the enrollment process in a computing community environment is a Profile Model, the steps of which are shown in FIG. 4. The Profile Model is a model where an end user person 14 is granted access to the community in some role based upon their profile information. Profile information includes certain characteristics about the end user person 14, such as the person's profession, ethnic background, age, family status and the like. In this model, there are at least one or more established rules that define the membership of a particular role of the community.

Referring to FIG. 4, the process is initiated by an action being defined (step 46). For example, the action may be to define roles for a court case in the community, such as judges, judicial clerks, and jurors. The rules for such a community could be defined as follows: If an end user person 14 holds the office of judge in the locale for the community, then they are given the role of Judge. If an end user person 14 holds the office of judicial clerk in the locale for the community then they are given the role of Judicial Clerk. If an end user person 14 is NOT a judge or a judicial clerk AND they are at least 18 years of age AND they are a United States citizen AND they reside in the locale of the community AND they have not been a juror in the last three (3) years AND there are currently no more than 45 Jurors, then they are given the role of Juror.

However, in order to make these rules affect the community membership, the action points in the community need to be defined which triggers the rule set evaluation (step 48). This rule set evaluation causes a determination to be made as to whether or not some individual matching the required profile parameters is in the community, and if so, what role in the community they will be granted (step 50). Membership in the community is updated (step 52), or not updated (step 54) accordingly. Therefore, in the above example, the defined action is to select jurors for a court case. After the rules are evaluated, the community membership is ultimately affected, e.g. a pool of 45 jurors is created. These rule set evaluations may be performed periodically resulting in a dynamic community membership.

An alternate model that is also contemplated is similar to the profile model discussed above but incorporates the payment or non-payment of fees to determine the qualifications of a community member candidate. Referring again to FIG. 4, the fee-based model provides a scenario where a community has roles, where a specific rule enforces who is in the community and in what role. A common interest club, such as a Wholesale Club, is used as an example.

In this example, there may be three roles, a Gold Club Member, a Silver Club Member, and a Regular Member. The rules governing enrollment may be as follows: If an end user person 14 has paid $50.00 for the current month, they are granted the Gold Club Member role. If an end user person 14 has paid $25.00 for the current month, they are granted the Silver Club Member role. If an end user person 14 has paid $10.00 for the current month, they are granted the Regular Club Member role. The rule set evaluation is engaged when an end user person 14 wishes to make a purchase in the Wholesale Club. The rules set is evaluated and the person's role is obtained. Similar to the profile model, step 50 is expanded for the fee-based model to determine if the end user person 14 has paid the required fee. If so, the end user person 14 qualifies for membership under a particular role. In the above example, the end user person 14 can make a purchase if they are in the club and their discount is applied based on the club role.

The Self Service model presented in FIG. 5 represents a true, no-obligation community where people can decide to opt into the community themselves and/or remove themselves without approval from an administrator. There are a variety of roles in the community, some or all of them are open to self-service. An end user person 14 can decide to join the community or leave the community at any time, and additionally, that person can select whatever role they wish from those roles which are open to the Self-Service model. This model is similar to the Administrative Model but in this case, each user is granted administration privileges over themselves only. Referring to FIG. 5, an end user person or persons 14 is designated as having a self-service privilege (step 56) and can join or leave a particular community (step 58). The end user person 14 can decide to leave the community if already a member (step 60) or to join a community and to select a role within that community (step 62). The end user person 14 may then enter the community under the selected role without permission from an administrator (step 64).

Another community member enrollment model that may be implemented is a Sponsored Model, shown in FIG. 6. There are roles in the community that have the Administration privilege and that can grant access to roles as in the Administrative Model discussed above. Additionally, there are other roles which allow for those in the role to add an end user person 14 to be a sponsored role. These roles do not grant administration privilege per se, but rather grant it by proxy. Finally, there are roles which are the sponsored role, meaning that they are granted to people who have been sponsored by some member 16 of the community and are granted some set of privileges in the community. It is the basic understanding that a sponsored role will eventually become a full-fledged role or be denied membership in the community.

In the Sponsored Model, a pre-existing community member 16 can sponsor a new member by adding them as a "sponsored member". Subsequently, when a certain set of criteria are achieved, the sponsored member evolves into a full member 16. For example, in a Golfing Club scenario, there may be designated roles: Administrators, Members and Sponsored members. Administrators can grant membership and can participate in the Club. Members 16 can sponsor other members and can participate in the Club. Sponsored Members can participate in the club, but only when accompanied by their Sponsor. When a Sponsored Member is added to the community, the Administrators are notified and a meeting is automatically scheduled at some future date, for example in 30 days, to vote on the new sponsored member's membership, at which time the Sponsored Member will either be granted a Member role or denied.

Referring to FIG. 6, a community member 16 is designated as a Sponsor Member, i.e. one who can sponsor others for enrollment in the community (step 66). The sponsor member may then designate an end user person 14 to be added to the community as a Sponsored Member (step 68). Although the Sponsored Member is now a member 16 of the community, the privileges granted to them are limited (step 70). For example, the Sponsored Member may participate in community activities only when accompanied or supported by their Sponsor Member. At a later date, the community votes on whether the Sponsored Member should become a full time member 16 of the community (step 72). Ultimately, the Sponsored Member is either denied membership (step 74) or granted membership in the community (step 76).

A variation of the above sponsored role community provides a community where there are regular roles and special trial role periods. In this variation, an end user person 14 can become a member 16 of the community for some trial period so they can evaluate the community as well as having the community evaluate them. At the end of the trial period, the end user person 14 is eligible to become a regular member 16 (or not). This can be applied to the Sponsor Model (shown in FIG. 6) or in the Fee-based Model (discussed above). With regard to the Sponsor Model, the community members 16 need to take action at the end of the trial period. In the Fee-Based Model, the trial member must take some action, such as paying a fee, to join. This is equivalent to paying a fee after having free use for some period of time.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer implemented method for managing member enrollment in a collaborative computing community, the method comprising:
   identifying one or more end user persons for enrollment in the collaborative computing community;
   implementing an enrollment model, executing in memory by a processor of a collaborative computing server, to determine whether to enroll the one or more identified end user persons as members in the community;
   updating community membership in an electronic storage medium of the collaborative computing server to enroll the one or more end user persons based on the implemented enrollment model; and
   wherein the implementing an enrollment model includes designating one or more community members as a sponsor member having privileges, the sponsor member granted a further privilege of sponsoring one or more of the end user persons for community membership as a sponsored member, wherein the sponsored member is granted a sponsored role in the community with privileges less than the privileges of a full member role.

2. The method of claim 1, wherein the implementing an enrollment model includes designating one or more community members as administrators with the authority to grant enrollment to the one or more end user persons.

3. The method of claim 2, further including providing the one or more community members with the ability to remove a community member from the community.

4. The method of claim 1, wherein the implementing an enrollment model to determine whether to enroll the one or more identified end user persons as members in the community includes:
   identifying one or more criteria for defining a role in the collaborative computing community;
   obtaining role profiles for each of the end user persons; and
   determining if one or more role profiles match the one or more criteria.

5. The method of claim 4, wherein the one or more criteria for defining a role in the collaborative computing community includes payment of a predetermined fee.

6. The method of claim 1, wherein the implementing an enrollment model includes providing one or more of the end user persons with the ability to grant enrollment to themselves.

7. The method of claim 6 further including providing the one or more end user persons with the ability to remove themselves from the community.

8. The method of claim 1, wherein the sponsored member is enrolled as a full community member if voted into the community.

9. The method of claim 1, wherein the sponsored member is enrolled as a full community member after the passage of a predetermined amount of time.

10. An electronic computer readable storage medium storing a computer program which when executed defines a method for managing member enrollment in a collaborative computing community, the computer program performing a method comprising:
    identifying one or more end user persons for enrollment in the collaborative computing community;
    implementing an enrollment model, executing in memory by a processor of a collaborative computing server, to determine whether to enroll the one or more identified end user persons as members in the community;
    updating community membership to enroll the one or more end user persons based on the implemented enrollment model; and
    wherein the implementing an enrollment model includes designating one or more community members as a sponsor member having privileges, the sponsor member granted a further privilege of sponsoring one or more of the end user persons for community membership as a sponsored member, wherein the sponsored member is granted a sponsored role in the community with privileges less than the privileges of a full member role.

11. The computer readable storage medium of claim 10, wherein the implementing an enrollment model includes designating one or more community members as administrators with the authority to grant enrollment to the one or more end user persons.

12. The computer readable storage medium of claim 11, wherein the method performed by the stored computer program when executed further includes providing the one or more community members with the ability to remove a community member from the community.

13. The computer readable storage medium of claim 10, wherein the implementing an enrollment model to determine whether to enroll the one or more identified end user persons as members in the community includes:
    identifying one or more criteria for defining a role in the collaborative computing community;
    obtaining role profiles for each of the end user persons; and
    determining if one or more role profiles match the one or more criteria.

14. The computer readable storage medium of claim 13, wherein the one or more criteria for defining a role in the collaborative computing community includes payment of a predetermined fee.

15. The computer readable storage medium of claim 10, wherein the implementing an enrollment model includes providing one or more of the end user persons with the ability to grant enrollment to themselves.

16. The computer readable storage medium of claim 15, wherein the method performed by the stored computer program when executed further includes providing the one or more end user persons with the ability to remove themselves from the community.

17. The computer readable storage medium of claim 10, wherein the sponsored member is enrolled as a community member if voted into the community.

18. The computer readable storage medium of claim 10, wherein the sponsored member is enrolled as a community member after the passage of a predetermined amount of time.

19. A system for managing member enrollment in a networked collaborative computing community, the system comprising:
    a workstation; and
    a collaborative computing server in data communication with the workstation via the network, the collaborative computing server being operative to:
      identify one or more end user persons for enrollment in the collaborative computing community;
      implement an enrollment model to determine whether to enroll the one or more identified end user persons as members in the community;
      update community membership to enroll the one or more end user persons based on the implemented enrollment model; and
      wherein the implement an enrollment model includes designating one or more community members as a sponsor member having privileges, the sponsor member granted a further privilege of sponsoring one or more of the end user persons for community membership as a sponsored member, wherein the sponsored member is granted a sponsored role in the community with privileges less than the privileges of a full member role.

20. The system of claim 19, wherein implementing an enrollment model includes designating one or more community members as administrators with the authority to grant enrollment to the one or more end user persons.

21. The system of claim 20, wherein the collaborative computing server is further operative to provide the one or more community members with the ability to remove a community member from the community.

22. The system of claim 19, wherein the implementing an enrollment model to determine whether to enroll the one or more identified end user persons as members in the community includes:
   identifying one or more criteria for defining a role in the collaborative computing community;
   obtaining role profiles for each of the end user persons; and
   determining if one or more role profiles match the one or more criteria.

23. The system of claim 22, wherein the one or more criteria for defining a role in the collaborative computing community includes payment of a predetermined fee.

24. The system of claim 19, wherein the implementing an enrollment model includes providing one or more of the end user persons with the ability to grant enrollment to themselves.

25. The system of claim 24 wherein the collaborative computing server is further operative to provide the one or more end user persons with the ability to remove themselves from the community.

26. The system of claim 19, wherein the sponsored member is enrolled as a community member if voted into the community.

27. The system of claim 19, wherein the sponsored member is enrolled as a community member after the passage of a predetermined amount of time.

\* \* \* \* \*